US010311240B1

(12) United States Patent
Nissler et al.

(10) Patent No.: US 10,311,240 B1
(45) Date of Patent: Jun. 4, 2019

(54) REMOTE STORAGE SECURITY

(71) Applicant: Google Inc., Mountain View, CA (US)

(72) Inventors: Mattias Stefan Nissler, Hamburg (DE); William Alexander Drewry, Nashville, TN (US); Darren David Krahn, Saratoga, CA (US)

(73) Assignee: Google LLC, Mountain View, CA (US)

( * ) Notice: Subject to any disclaimer, the term of this patent is extended or adjusted under 35 U.S.C. 154(b) by 4 days.

(21) Appl. No.: 14/835,652

(22) Filed: Aug. 25, 2015

(51) Int. Cl.
*H04L 9/00* (2006.01)
*G06F 21/60* (2013.01)
*H04L 9/08* (2006.01)
*H04L 29/06* (2006.01)
*H04L 9/32* (2006.01)

(52) U.S. Cl.
CPC .......... *G06F 21/602* (2013.01); *H04L 9/0861* (2013.01); *H04L 9/3263* (2013.01); *H04L 9/3268* (2013.01); *H04L 63/0428* (2013.01)

(58) Field of Classification Search
CPC .................................................. G06F 21/602
USPC ........................................................ 713/193
See application file for complete search history.

(56) References Cited

U.S. PATENT DOCUMENTS

| 6,751,731 | B1 * | 6/2004 | Binding ............. H04L 63/0869 709/203 |
| 6,978,365 | B2 * | 12/2005 | England ................ G06F 9/4416 713/156 |
| 8,332,604 | B2 | 12/2012 | Mangold et al. |
| 8,412,945 | B2 | 4/2013 | Sweet et al. |
| 2006/0015751 | A1 * | 1/2006 | Brickell .................. G06F 21/73 713/193 |
| 2006/0282680 | A1 * | 12/2006 | Kuhlman ................ G06F 21/32 713/186 |
| 2011/0167503 | A1 * | 7/2011 | Horal ...................... G06F 21/10 726/33 |
| 2012/0159178 | A1 * | 6/2012 | Lin ....................... H04L 9/3247 713/178 |
| 2012/0321086 | A1 | 12/2012 | D'Souza et al. |
| 2013/0073851 | A1 * | 3/2013 | Hashimoto .......... H04L 9/3247 713/168 |
| 2014/0019753 | A1 | 1/2014 | Lowry et al. |
| 2014/0068254 | A1 | 3/2014 | Scharf et al. |
| 2014/0181514 | A1 | 6/2014 | Aoyagi et al. |
| 2014/0270179 | A1 | 9/2014 | Shen et al. |

OTHER PUBLICATIONS

Bitcoin Wiki, "Hardware Wallet," retrieved from <https://en.bitcoin.it/wiki/Hardware_wallet>, last revised Jun. 11, 2015.
Zwattendorfer, et al., "Secure Hardware-Based Public Cloud Storage," Open Idntity Summit, 2013, retrieved from <https://online.tugraz.at/tug_online/voe_main2.getvolltext?pCurrPk=72221>.
The Chromium Projects—TPM Usage, retrieved May 11, 2015 from <https://www.chromium.org/developers/design-documents/tpm-usage>.

* cited by examiner

*Primary Examiner* — Christopher J Brown
(74) *Attorney, Agent, or Firm* — Morgan, Lewis & Bockius LLP

(57) ABSTRACT

Aspects of the subject technology relate to systems and methods for remote storage security. An encryption key is generated based at least on data stored locally by a computing device. The encryption key is bound to a context of the computing device. Data is encrypted using the encryption key. The encrypted data and information associated with the binding of the encryption key are provided for transmission to another computing device.

19 Claims, 7 Drawing Sheets

REMOTE STORAGE SECURITY

TECHNICAL FIELD

The present disclosure generally relates to data storage and, in particular, to remote storage security.

BACKGROUND

A computing device may utilize storage media built into the computing device to store data. By way of non-limiting example, the computing device may be a desktop computer, laptop, tablet, phone, among others. The data stored in such local storage of the computing device may be prone to loss, such as through software bugs that delete data, accidental user action, intentional user action, and so forth. For example, the data stored in the local storage may be deleted when the computing device is wiped (e.g., hardware reset, installation of a different operating system, etc.).

Alternatively or in addition, the computing device may utilize a remote storage device, such as that provided by a cloud storage service, to store data of the computing device. In general, data stored in the remote storage device may persist independent of any data loss of the data stored in the local storage of the computing device. When utilizing remote storage, additional measures are generally taken to protect the remotely stored data from situations such as access to and/or alteration of the remotely stored data by malicious parties.

SUMMARY

Aspects of the subject technology relate to a computer-implemented method for facilitating providing of remote storage security. The method includes generating, by a first computing device, a first encryption key based at least on data stored locally by the first computing device. The method also includes binding the encryption key to a context of the first computing device, where the context includes a timestamp associated with the binding. The method also includes encrypting data using the first encryption key. The method also includes providing, for transmission to a second computing device, the encrypted data and information associated with the binding.

Aspects of the subject technology also relate to a system for facilitating providing of remote storage security. The system includes one or more processors and a non-transitory computer-readable medium comprising instructions stored therein, which, when processed by the one or more processors, cause the one or more processors to perform operations. The operations include receiving a binding certificate from a computing device. The operations also include generating a first encryption key based at least on data stored locally in the system. The operations also include binding the first encryption key to the binding certificate. The binding certificate includes information associated with a context of the system, where the context includes a timestamp associated with the binding certificate. The operations also include encrypting data using the first encryption key. The operations also include providing, for transmission to a storage device, the encrypted data and the binding certificate.

Aspects of the subject technology also relate to a non-transitory machine-readable medium including instructions stored therein, which when executed by a machine, cause the machine to perform operations. The operations include generating, by a first computing device, a nonce. The operations also include providing, for transmission to a second computing device, the generated nonce. The operations also include receiving an identifier from the second computing device, where the received identifier is based at least on the generated nonce. The operations also include generating, by a first computing device, a first encryption key based at least on data stored locally by the first computing device and the received identifier. The operations also include binding the encryption key using a binding certificate that includes context of the first computing device. The context may include the generated nonce. The operations also include encrypting data using the first encryption key. The operations also include providing, for transmission to a storage device, the encrypted data and information associated with the binding.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

The subject technology provides systems and methods for facilitating remote (e.g., off-device) storage security. The remote storage may be a cloud-based storage, provided by a cloud service, to which a computing device uploads data. The subject technology facilitates re-acquiring of information to be utilized to retrieve data stored in the remote storage, such as subsequent to a wipe of the computing device. In one or more implementations, the subject technology allows a computing device to securely re-acquire device state after a reset (e.g., factory reset). For example, enterprise-enrolled devices may remain under control of remote management, even after malicious or accidental state loss on the computing device, based on re-acquiring of the device state through retrieval of the data previously stored by the computing device on the remote storage.

In one or more implementations, the subject technology ties an encryption key to the computing device that generated the encryption key, where the encryption key allows decryption of the previously-stored data on the remote storage. The subject technology facilitates re-acquiring of information to be utilized to generate the encryption key, such as subsequent to a wipe of the computing device.

Figure 1:
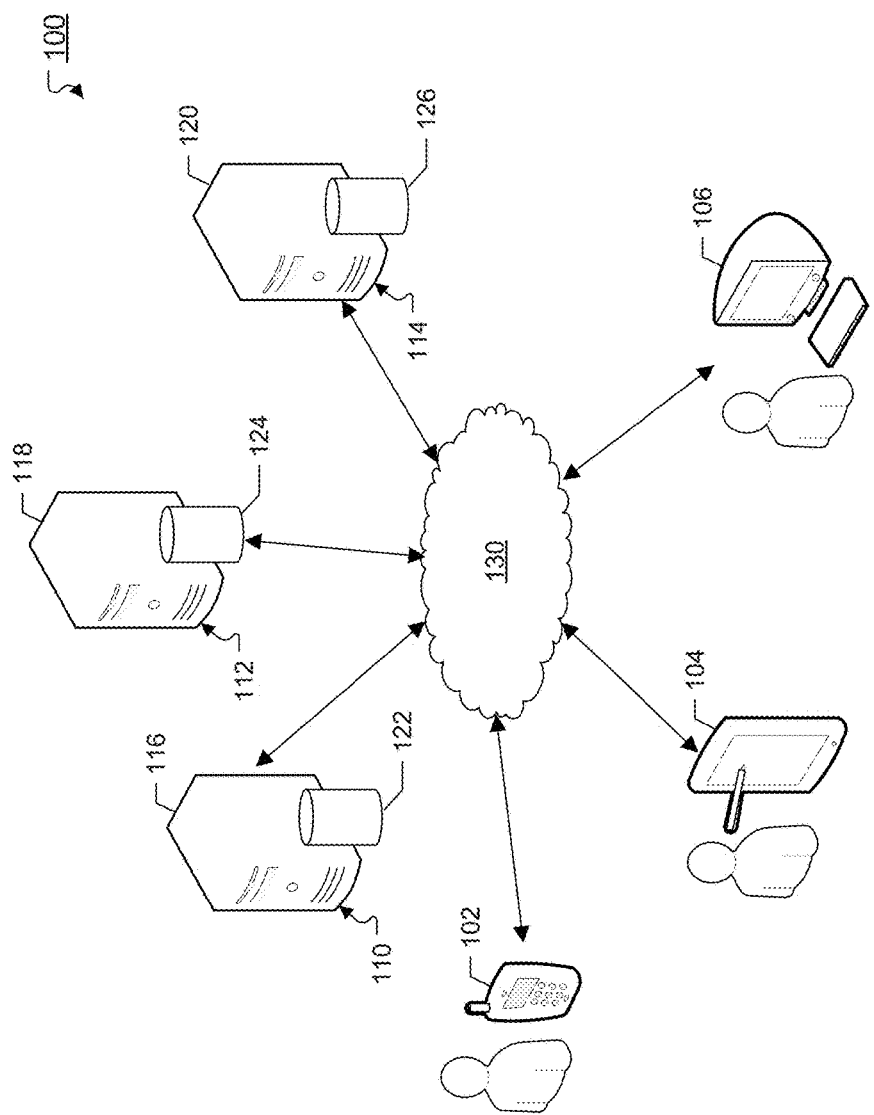
FIG. 1 illustrates an example network environment in which a remote storage security can be provided, in accordance with one or more implementations.

FIG. 1 illustrates an example network environment 100 in which a remote storage security can be provided, in accordance with one or more implementations. The network environment 100 includes computing devices 102, 104, and 106 (hereafter "102-106") and computing systems 110, 112, and 114 (hereafter "110-114"). Computing devices 102-106 and computing systems 110-114 can communicate with each other through a network 130. Each of computing systems 110-114 can include one or more computing devices 116, 118, and 120 (e.g., one or more servers) and one or more computer-readable storage devices 122, 124, and 126 (e.g., one or more databases). In some aspects, the network environment 100 can have more or fewer computing devices (e.g., 102-106) and/or computing systems (e.g., 110-114) than those shown in FIG. 1.

Each of the computing devices 102-106 can be associated with a user that may store data into or retrieve data from a remote storage (e.g., an off-device storage). The computing devices 102-106 can represent various forms of processing devices. By way of non-limiting example, processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any of these data processing devices or other data processing devices.

Each of the computing systems 110-114 may be any system or device having a processor, a memory, and communications capability for providing a service to the computing devices 102-106. In some example aspects, any of computing systems 110-114 can be a single computing device (e.g., 116) such as, for example, a computer server. In other implementations, any of computing systems 110-114 can represent more than one computing device working together to perform the actions of a computer server (e.g., cluster of machines). Further, any of computing systems 110-114 can represent various forms of servers including, but not limited to, a web server, an application server, a proxy server, a network server, or a server farm.

For example, the computing system 110 may be, may include, or may be a part of, a Privacy Certification Authority (Privacy CA or PCA) that may, upon request, generate identifiers and/or certificates to be utilized by the computing devices 102-106. The computing system 112 may be, may include, or may be a part of, a storage server. The computing system 112 may provide a cloud service that provides storage for the computing devices 102-106.

In some aspects, the computing devices and systems, including 102-106 and 110-114, may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS) or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, General Packet Radio System (GPRS), Single-carrier Frequency Division Multiple Access (SC-FDMA), or Orthogonal FDMA (OFDMA), among others. For example, the communication may occur through a radio-frequency transceiver (not shown). In addition, short-range communication may occur, for example, using a Bluetooth, WiFi, or other such transceiver.

In some aspects, network environment 100 can be a distributed client/server system that spans one or more networks such as, for example, network 130. Network 130 can be a large computer network such as, for example, a local area network (LAN), wide area network (WAN), the Internet, a cellular network, or a combination thereof connecting any number of mobile clients, fixed clients, and servers. Further, the network 130 can include, but is not limited to, any one or more of the following network topologies, including a bus network, a star network, a ring network, a mesh network, a star-bus network, tree or hierarchical network, and the like. In some aspects, communication between each client (e.g., computing devices 102-106) and server (e.g., computing systems 110-114) can occur via a virtual private network (VPN). Secure Shell (SSH) tunnel, or other secure network connection. In some aspects, network 130 may further include a corporate network (e.g., intranet) and one or more wireless access points.

For explanatory purposes in the present disclosure, the computing system 110 is the Privacy CA and the computing system 112 is the storage server. Interactions of the computing devices 102-106 with the computing system 110 and the computing system 112 will be made with reference to the computing device 102. However, the computing devices 104 and 106, as well as other computing devices not shown in FIG. 1, may also interact with the computing system 110 and the computing system 112. Furthermore, operations performed by the Privacy CA may be implemented through use of one or multiple computing systems, including the computing system 110. Similarly, operations performed by and storage provided by the storage server may be implemented through use of one or multiple computing systems, including the computing system 112.

Figure 2:
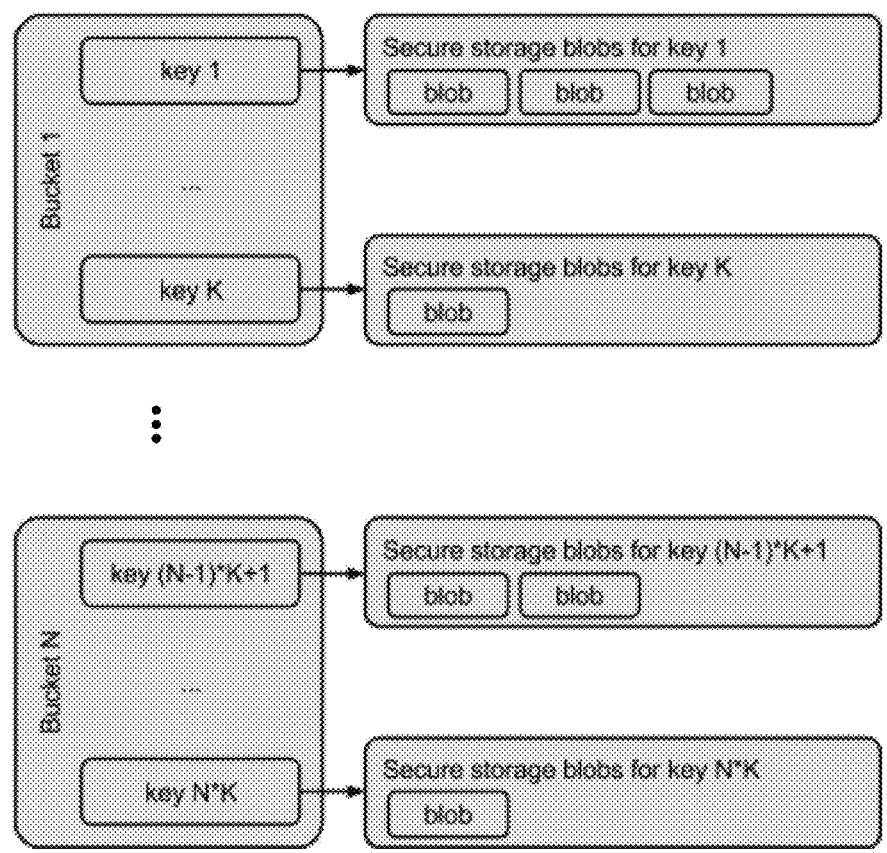
FIG. 2 illustrates example data structures utilized for data stored in a storage server, in accordance with one or more implementations.

FIG. 2 illustrates example data structures utilized for data stored in the computing system 112 (e.g., the storage server) in accordance with one or more implementations. The data is stored as data binary large objects (blobs) in the computing system 112. The data and data blobs may be referred to as payload. In some aspects, the data blobs stored in the computing system 112 are encrypted. The data stored in the computing system 112 may be accessed through a data identifier, which may also be referred to as a data key. Each data blob is attached to, also referred as keyed by, one data identifier. For each data identifier, the computing system 112 may keep a list of storage blobs along with metadata. Based on a given data identifier received by the computing system 112 from the computing device 102, the computing system 112 may allow the computing device 102 to download a list of storage blobs for the given data identifier. For example, the computing system 112 may return the list of storage blobs associated with the given data identifier upon request from the computing device 102. In some aspects, the retrieval of the list of storage blobs is a public application program interface (API) that does not require authentication.

The computing system 112 may split the namespace of data identifiers into buckets of a predetermined size. The predetermined size may be a manageable size with respect to a total size of a list of all data keys in a bucket. Larger buckets are generally associated with longer lists, which in turn may be associated with higher network resource usage and longer time involved in downloading the lists when the computing device 102 downloads the lists. Each bucket may be associated with multiple data identifiers. For example, in FIG. 2, Bucket 1 is associated with data identifier 1 through data identifier K and Bucket N is associated with data identifier (N−1)*K+1 through data identifier N*K. When provided with a request for data identifiers associated with a bucket (e.g., by the computing device 102), the computing system 112 may perform a retrieval operation to retrieve and return a list of data identifiers within the requested bucket. In some aspects, the retrieval of the data identifiers is a public API that does not require authentication.

In one or more implementations, content of the data blobs is opaque to the computing system 112. In this regard, in some aspects, while the computing system 112 may know the bits contained in the data blobs, the computing system 112 is unable to decrypt the data blobs to determine a meaning of the content of the data blobs. The computing system 112 may be utilized to provide a storage service without needing to know the meaning of the content of the data blobs. In such cases, the computing system 112 is generally unable to determine whether a given data blob is valid or invalid. For example, the computing system 112 may be unable to determine whether a given data blob is an invalid data blob uploaded by an attacker in an attempt to stage a spoofed data blob. The computing device 102 may detect and reject invalid data blobs when going through the list of storage blobs attached to (e.g., keyed by) a data identifier.

In one or more implementations, the storage service provided by the computing system 112 may be tied to an authentication service. The authentication service may authenticate uploaded data blobs. Tying uploaded data blobs to an authentication service account may allow placing of quotas on uploaded data blobs, which mitigates denial of service attacks involving uploading a large number of data blobs for a single data identifier. Tying uploaded data blobs to the authentication service account may allow the computing system 112 to purge previous uploads to the same data identifier from the same authentication service account.

Figure 3:
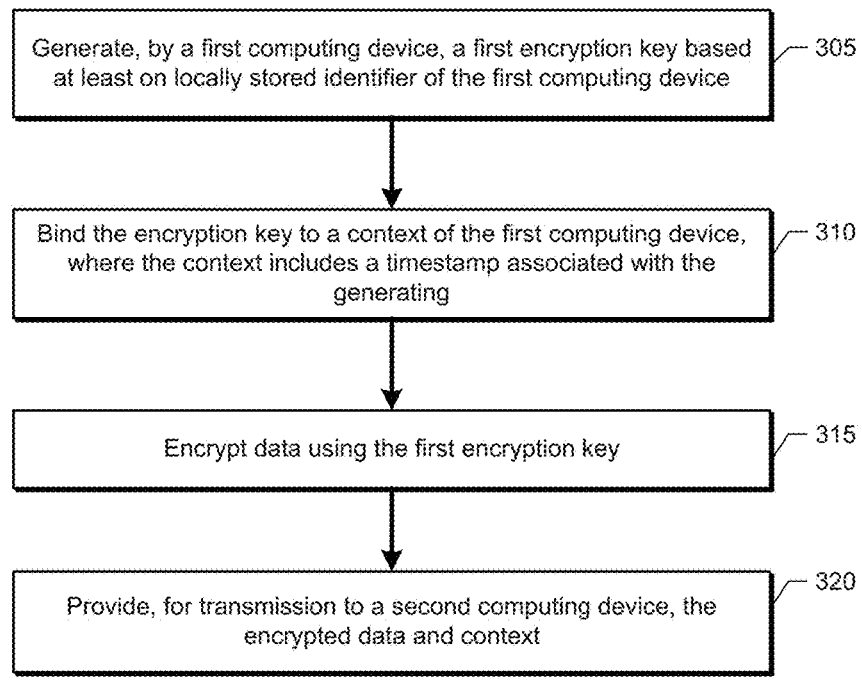
FIG. 3 is a flowchart illustrating an example process to allow storing of data in a storage server, in accordance with one or more implementations.

FIG. 3 is a flowchart illustrating an example process 300 to allow storing data of by the computing device 102 in the computing system 112 (e.g., the storage server), in accordance with one or more implementations. The steps of the example process 300 do not need to be performed in the order shown. It is understood that the depicted order is an illustration of one or more example approaches, and are not meant to be limited to the specific order or hierarchy presented. The steps can be rearranged, and/or two or more of the steps can be performed simultaneously. For explanatory purposes, the example process 300 is described herein with reference to the computing device 102, computing system 110 (e.g., the Privacy CA), and computing system 112 of the example network environment 100 of FIG. 1; however, the example process 300 is not limited to the computing device 102, computing system 110, and computing system 112.

As set forth in step 305 in FIG. 3, the computing device 102 generates an encryption key based at least on locally stored identifier of the computing device 102. The locally stored identifier may be a random character and/or combination of characters (e.g., alphabetic and/or numeric characters) set in memory of the computing device 102. For example, the locally stored identifier may be assigned to the computing device 102 during manufacturing and stored in memory (e.g., a read-only partition of the memory). In some aspects, the locally stored identifier is not known to the computing system 110 (e.g., the Privacy CA) and computing system 112 (e.g., the storage server). In some aspects, the computing device 102 utilizes the locally stored identifier as a secret identifier and does not provide the locally stored identifier to other devices or systems (e.g., the computing systems 110 and 112). The locally stored identifier is generally intended to be known only to the computing device 102. The locally stored identifier may be stored in read-only memory or otherwise stored in a manner to help avoid deletion of (e.g., accidentally, intentionally) the locally stored identifier.

In one or more implementations, the encryption key may be generated based also on an identifier generated by the computing system 112 and provided to the computing device 102, referred to hereafter as a PCA-brokered identifier. The encryption key may be generated based on the PCA-brokered identifier and the locally stored identifier in a one-way function. For example, a hash message authentication code (HMAC)-based key derivation function (HKDF) may be utilized to generate the encryption key. As another example, an Advanced Encryption Standard Galois/Counter Mode (AES-GCM) may be utilized to generate the encryption key. Other key derivation functions may be utilized.

The computing system 110 may generate the PCA-brokered identifier based on one or more of a client nonce provided to the computing system 110 by the computing device 102 when creating a secure storage blob, a boot mode associated with the computing device 102, or a locally stored identifier of the computing system 110. The locally stored identifier is not known to the computing device 102 and computing system 112 (e.g., the storage server).

The client nonce may be randomly generated by the computing device 102, e.g., to help prevent predictable results that may be utilized by attackers (e.g., by reusing known-valid results from previous runs). The locally stored identifier of the computing system 110 may be a random character and/or combination of characters (e.g., alphabetic and/or numeric characters) set in memory (e.g., read-only memory) during manufacturing of the computing system 110. In some aspects, the computing system 110 utilizes the locally stored identifier as a secret identifier and does not provide the locally stored identifier to other devices or systems (e.g., the computing device 102 and the computing system 112). The locally stored identifier is generally intended to be known only to the computing system 110. The locally stored identifier may be stored in read-only memory or otherwise stored in a manner to help avoid deletion of (e.g., accidentally, intentionally) the locally stored identifier.

Alternatively or in addition, in one or more implementations, the PCA-brokered identifier may be based on a PCA-generated device identifier. The PCA-generated device identifier may be generated based on an endorsement key from a Trusted Platform Module (TPM) of the computing device 102. The TPM endorsement key is a permanent asymmetric encryption key pair individually assigned to each TPM during manufacturing. The PCA-generated device identifier may be generated by utilizing a keyed-HMAC secure hash algorithm (SHA), such as HMAC-SHA256. For example, the PCA-generated device identifier may be generated by the hash function HMAC_SHA256 (EK_fp, reset_token|reset_count), where EK_fp denotes a public half of the endorsement key. Other message authentication codes aside from the HMAC-SHA256 may be utilized to generate the PCA-generated device identifier, such as cipher-based MAC (CMAC). Cryptographic hash functions such as the message-digest (MD) algorithm may also be utilized.

When the computing system 110 generates the PCA-generated device identifier for a first time for the computing device 102 in response to a request from the computing device 102 for a PCA-brokered identifier, the computing system 110 generates the PCA-generated device identifier with both the reset token (reset_token) and reset count (reset_count) set to 0. When the PCA-generated device identifier is revoked, the revoked PCA-generated device identifier, the reset count, and a randomly generated reset token are stored in the computing system 110. In a next request from the computing device 102 for a PCA-brokered identifier, the computing system 110 may generate a next PCA-generated device identifier based on the stored reset token and an increased reset count. Subsequent PCA-generated device identifiers may be generated in a similar manner. Although the EK_fp, which may be utilized to identify the computing device 102, is utilized as a key to generate the PCA-generated device identifier, the EK_fp is difficult to determine from the PCA-generated device identifier due to the utilization of the HMAC. The PCA-generated device identifier may be utilized by the computing system 110 to generate the PCA-brokered identifier, where the PCA-brokered identifier is provided to the computing device 102.

In one or more implementations, the computing system 110 may derive the PCA-brokered identifier utilizing a pseudo-random key generation scheme based on the client nonce, the boot mode of the computing device 102, the PCA-generated device identifier, and the locally stored identifier of the computing system 110. In such cases, the PCA-brokered identifier is specific to the client nonce, boot mode, and endorsement key utilized to generate the PCA-brokered identifier. For example, the pseudo-random key generation scheme may utilize HKDF, although other key derivation functions may be utilized. The locally stored identifier may be utilized as input key information while the client nonce, boot mode, and PCA-generated device identifier may be utilized as context/application specific information.

As set forth in step 310 in FIG. 3, the computing device 102 binds the encryption key to a context of the computing device 102. In one or more implementations, the computing device 102 may bind the encryption key to the computing device 102 by utilizing a binding certificate received from the computing system 110 (e.g., the Privacy CA). In such cases, the computing device 102 may send a request to the computing system 110 for a binding certificate and receive the binding certificate from the computing system 110. The request may be, may include, or may be a part of, a remote attestation handshake with the computing system 110. The remote attestation may be utilized to allow verification of the identity of the TPM by challenging the endorsement key of the TPM and providing a certificate attesting to the identity of the TPM and a configuration (e.g., context) at the time of the remote attestation. The binding certificate may include information related to the context of the computing device 102 and allow binding of the encryption key to the context of the computing device 102.

The context of the computing device 102 may include, for example, a boot mode of the computing device at an attestation response creation time, a fingerprint of a hardware identifier (e.g., a public half of a TPM endorsement key), and/or a certificate creation timestamp (e.g., indicating a time of creation of the binding certificate) provided by the computing system 110. The context may also include the client nonce generated by the computing device 102. In some aspects, information related to the boot mode that is included in the binding certificate needs to match a platform configuration register (PCR) selection (e.g., PCR0 selection) encoded in the attestation response in order to allow determination of the computing device 102 actually running in the boot mode claimed by the binding certificate. Binding the encryption key to the context may help prevent attackers from reusing encryption keys in a context different from the context bound to the encryption key. For example, the different context may be associated with a time that the attacker had possession of the computing device 102.

Although implementations described make reference to the TPM, other types of hardware security modules that allow generation of an encryption key, either directly or indirectly, that is accessible only to the computing device 102 and binding of the encryption key to the context of the computing device 102 may be utilized.

In one or more implementations, the computing device 102 may bind the encryption key to the computing device 102 without utilizing a remote attestation handshake with the computing system 110. In such cases, the computing device 102 may include a permanent non-extractable symmetric encryption key embedded in hardware of the computing device 102. The computing device 102 may bind the encryption key using a permanent asymmetric signing key embedded in hardware of the computing device 102.

In one or more implementations, alternative or in addition to the PCA-brokered identifier, a similarly generated identifier may be generated by a local operation of the computing device 102. The computing device 102 may utilize a hardware security module to generate the identifier from the client nonce. The generated identifier generated by the hardware security module may be used similarly to the PCA-brokered identifier as described above.

As set forth in step 315 in FIG. 3, the computing device 102 encrypts data using the encryption key. As set forth in step 320 in FIG. 3, the computing device 102 provides the encrypted data and information associated with the binding for transmission to the computing system 112 (e.g., the storage server) to allow storage on the computing system 112. The information associated with the binding may be utilized for retrieving and/or decrypting the encrypted data in the future. For example, the information associated with the binding may include the binding certificate and/or the context of the computing device 102. The binding certificate may be encrypted using a symmetric encryption key prior to being provided for transmission to the computing system 112. In some aspects, the computing device 102 may generate and provide for transmission a data identifier along with the encrypted data, where the data identifier is attached to the encrypted data and is utilized in the future to access the encrypted data in the computing system 112.

Figure 4:
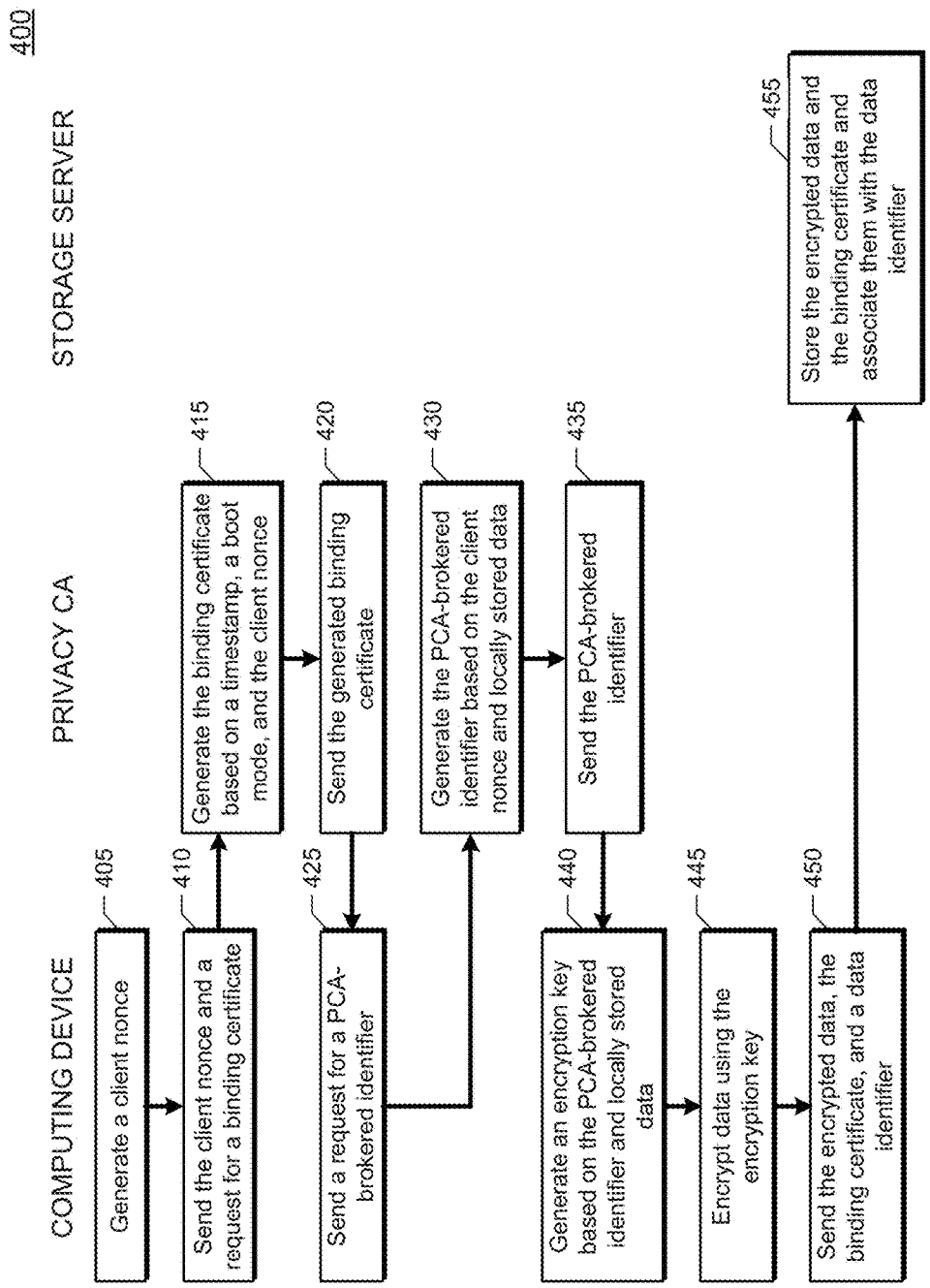
FIG. 4 is a flowchart illustrating an example process to allow storing of data in a storage server, in accordance with one or more implementations.

FIG. 4 is a flowchart illustrating another example process 400 to allow storing of data in the computing system 112 (e.g., the storage server) by the computing device 102, in accordance with one or more implementations. The steps of the example process 400 do not need to be performed in the order shown. It is understood that the depicted order is an illustration of one or more example approaches, and are not meant to be limited to the specific order or hierarchy presented. The steps can be rearranged, and/or two or more of the steps can be performed simultaneously. For explanatory purposes, the example process 400 is described herein with reference to the computing device 102, computing system 110 (e.g., the Privacy CA), and computing system 112 of the example network environment 100 of FIG. 1; however, the example process 400 is not limited to the computing device 102, computing system 110, and computing system 112.

As set forth in step 405 in FIG. 4, the computing device 102 generates a client nonce. The client nonce may be generated using a pseudorandom number generator. As set forth in step 410 in FIG. 4, the computing device 102 sends the client nonce and a request for a binding certificate to the computing system 110. The request may be, may include, or may be a part of, a remote attestation handshake with the computing system 110. Along with the client nonce and the request, the computing device 102 may also send a fingerprint of a hardware identifier, such as a public half of an endorsement key (e.g., a TPM endorsement key), and/or a public half of an attestation identity key to the computing system 110.

As set forth in step 415 in FIG. 4, the computing system 110 generates the binding certificate based on the client nonce, a timestamp associated with the binding certificate, and a boot mode associated with the computing device 102. The generated binding certificate may include the client nonce, the timestamp, and the boot mode. The timestamp may be obtained by the computing system 110 from a reliable time source to tie the binding certificate to a specific point in time, such as a creation time of the binding certificate. The boot mode (e.g., verified boot mode, developer mode) included in the binding certificate may be the boot mode of the computing device 102 at an attestation response creation time. As set forth in step 420 in FIG. 4, the computing system 110 sends the generated binding certificate to the computing device 102. In some aspects, the computing system 110 may encrypt the binding certificate using the public half of the endorsement key and send the encrypted binding certificate to the computing device 102.

As set forth in step 425 in FIG. 4, the computing device 102 sends a request for a PCA-brokered identifier from the computing system 110. As set forth in step 430 in FIG. 4, the computing system 110 generates the PCA-brokered identifier based on the client nonce and a locally stored identifier of the computing system 110. The locally stored identifier may include locally stored data in the computing system 110 that may be a random character and/or combination of characters (e.g., alphabetic and/or numeric characters) set in memory during manufacturing of the computing system 110. The PCA-brokered identifier may also be generated based on one or more of a PCA-generated device identifier, such as described with reference to step 305 in FIG. 3, the public half of the endorsement key, and the boot mode associated with the computing device 102.

In some aspects, the computing system 110 utilizes the locally stored identifier as a secret identifier and does not provide the locally stored identifier to other devices or systems (e.g., the computing device 102 and the computing system 112). The locally stored identifier is generally intended to be known only to the computing system 110. The locally stored identifier may be stored in read-only memory or otherwise stored in a manner to help avoid deletion of (e.g., accidentally, intentionally) the locally stored identifier.

As set forth in step 435 in FIG. 4, the computing system 110 sends the PCA-brokered identifier to the computing device 102. The PCA-brokered identifier may be provided as part of an attestation response. In some aspects, the attestation response may be encrypted. As set forth in step 440 in FIG. 4, the computing device 102 generates an encryption key based on the PCA-brokered identifier and the locally stored identifier of the computing device 102. When the PCA-brokered identifier is provided as part of an encrypted attestation response, the computing device 102 may decrypt the attestation response using a private half of the endorsement key. The computing device 102 may generate the encryption key based on the PCA-brokered identifier and the locally stored identifier of the computing device 102 in a one-way function. For example, an HKDF may be utilized to generate the encryption key. As another example, AES-GCM may be utilized to generate the encryption key. Other key derivation functions may be utilized.

As set forth in step 445 in FIG. 4, the computing device 102 encrypts data using the encryption key. As set forth in step 450 in FIG. 4, the computing device 102 sends the encrypted data, the binding certificate, and a data identifier to the computing system 112. The computing device 102 may encrypt the binding certificate in some aspects. The computing device 102 may generate the data identifier to be associated with the encrypted data and that may be utilized to allow the computing device 102 access to the encrypted data in the future.

In one or more implementations, the computing device 102 may generate the data identifier based at least on a time period and data stored locally by the computing device 102. For example, the data identifier may be generated utilizing a timestamp corresponding to a first period of validity of the data identifier and locally stored data in a one-way function (e.g., a one-way hash function). The locally stored data (e.g., locally stored identifier) utilized to generate the data identifier may be the same as or different from the locally stored data utilized to generate the encryption key. Within the first time period of validity, the computing device 102 may be able to generate the same data identifier, which may facilitate continued association of the computing device 102 with the data keyed by the data identifier (e.g., even in a case where the computing device 102 has been wiped and reinstalled within the first time period of validity)

Outside of the first time period of validity, the data identifier may no longer be utilized by the computing device 102 to access the data previously keyed by the data identifier. For each time period of validity, the computing device may generate a different data identifier for the data. In some implementations, the computing device 102 may generate a data identifier for a second time period of validity and provide this data identifier to the computing system 112 prior to the second time period of validity to be used by the computing device 102 to access the associated data during the second time period of validity. The data identifier may be referred to as a time-scoped identifier.

As set forth in step 455 in FIG. 4, the computing system 112 stores the encrypted data and the binding certificate and associates the data identifier with (e.g., keys the data identifier to) the encrypted data and the binding certificate. The computing device 102 may utilize the data identifier to access the associated encrypted data and binding certificate in the future, such as subsequent to a wipe of the computing device 102.

Figure 5:
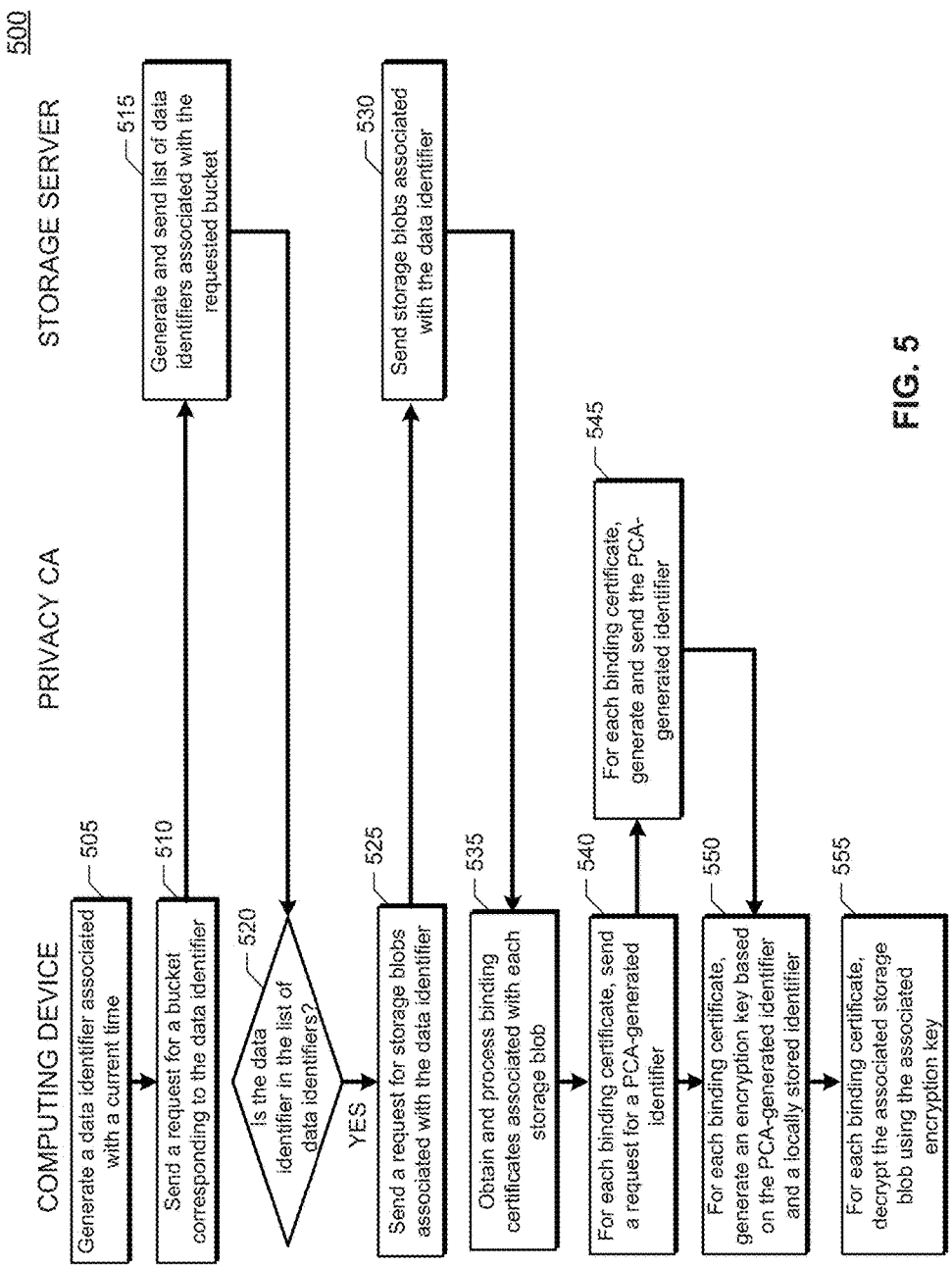
FIG. 5 is a flowchart illustrating an example process to allow retrieve of data stored in a storage server, in accordance with one or more implementations.

FIG. 5 is a flowchart illustrating an example process 500 to allow the computing device 102 to retrieve data stored in the computing system 112 (e.g., the storage server), in accordance with one or more implementations. The steps of the example process 500 do not need to be performed in the order shown. It is understood that the depicted order is an illustration of one or more example approaches, and are not meant to be limited to the specific order or hierarchy presented. The steps can be rearranged, and/or two or more of the steps can be performed simultaneously. For explanatory purposes, the example process 500 is described herein with reference to the computing device 102, computing system 110 (e.g., the Privacy CA), and computing system 112 of the example network environment 100 of FIG. 1; however, the example process 500 is not limited to the computing device 102, computing system 110, and computing system 112. In one or more implementations, the example process 500 may be performed by the computing device 102 after a wipe of the computing device 102.

As set forth in step 505 in FIG. 5, the computing device 102 generates a data identifier based on a current time. The data identifier may be generated in a manner similar to that discussed for step 450 in FIG. 4. As set forth in step 510 in FIG. 5, the computing device 102 requests a bucket from the computing system 112 that corresponds to the data identifier. As set forth in step 515 in FIG. 5, the computing system 112 generates a list of data identifiers associated with the requested bucket and sends the generated list to the computing device 102.

As set forth in step 520 in FIG. 5, the computing device 102 determines whether the data identifier generated by the computing device 102 is contained in the list of data identifiers from the computing system 112. In some cases, the list of data identifiers may not include the data identifier generated by the computing device 102 when the computing device 102 has not previously uploaded information for storage in the computing system 112. For example, a factory-fresh device that has not previously uploaded information to the computing system 112 may not be aware that it is factory-fresh and may attempt to restore previous data. As another example, an owner of the computing device 102 may not have caused the computing device 102 to make use of a secure off-device storage, in which case the computing device 102 may not have previously uploaded any data to the computing system 112 (e.g., prior to a factory reset). In these examples, the data identifier generated by the computing device 102 is not contained in the list of data identifiers from the computing system 112.

As set forth in step 525 in FIG. 5, if the data identifier generated by the computing device 102 is contained in the list of data identifiers from the computing system 112, the computing device 102 requests storage blobs associated with the data identifier generated by the computing device 102. As set forth in step 530 in FIG. 5, the computing system 112 sends storage blobs associated with the data identifier to the computing device 102. These storage blobs were previously generated by the computing device 102 and stored in the computing system 112.

As set forth in step 535 in FIG. 5, the computing device 102 obtains (e.g., extracts) binding certificates associated with the storage blobs and processes the binding certificates. The processing may include decrypting the binding certificate when the binding certificate is encrypted, verifying data included in the binding certificate, among others. If the binding certificate in a storage blob was previously encrypted by the computing device 102 using an encryption key (e.g., a symmetric encryption key) derived from a locally stored identifier of the computing device 102, the computing device 102 may utilize the locally stored identifier of the computing device 102 to decrypt the binding certificate. The computing device 102 may validate the signature of the computing system 110 using a public key used by the computing system 110 for signature validation.

If the binding certificate is valid, the computing device 102 may perform verification of data included within the binding certificate. The verification may include determining whether there is a match between the endorsement key fingerprint contained in the binding certificate compared to a fingerprint determined from an endorsement key of the TPM of the computing device 102. A match between the two fingerprints is indicative of the binding certificate being created for the same TPM. Alternatively or in addition, the verification may include determining whether there is a match between a boot mode the computing device was operating in when creating the binding certificate, as indicated by the binding certificate, and a current boot mode of the computing device 102. The computing device 102 may utilize the certificate creation timestamp to determine a set of valid data identifiers that the binding certificate is good for. The computing device 102 may then check that the data identifier used to retrieve the binding certificate from the computing system 112 is contained in the determined set of data identifiers.

One or multiple of the above verifications may be performed to allow the computing device 102 to determine a subset of valid secure storage blobs with encryption keys bound to the computing device 102. The computing device 102 may continue verification of each storage blob in the subset, as described with reference to steps 540, 545, 550, and 555. In some aspects, the computing device 102 may arrange the secure storage blobs in chronological order based on creation timestamps in the binding certificates, and select for continued verification the storage blob associated with a most recent creation timestamp.

As set forth in step 540 in FIG. 5, for a given binding certificate, the computing device 102 sends a request for a PCA-brokered identifier from the computing system 110. To generate the request, the computing device 102 may extract the client nonce contained in the binding certificate and provide the client nonce with the request and/or as part of the request. As set forth in step 545 in FIG. 5, the computing system 110 generates and sends the PCA-brokered identifier to the computing device 102. The PCA-brokered identifier may be generated based on the public half of the endorsement key, the client nonce, and a locally stored identifier of the computing system 110.

As set forth in step 550 in FIG. 5, the computing device 102 generates an encryption key based on the PCA-generated identifier and a stable device identifier of the computing device 102. As set forth in step 555 in FIG. 5, the computing device 102 attempts to decrypt the storage blob associated with the given binding certificate using encryption key. The decryption may fail if there is a mismatch between the encryption key utilized to encrypt a given storage blob and the encryption key generated in step 555 for decrypting the given storage blob. Such a mismatch in the encryption keys is indicative of the given storage blob having been tampered with.

If the storage blob is valid, the computing device 102 successfully decrypts the storage blob using the encryption key generated in step 555. A failure of any of the verification steps (e.g., steps 535, 540, 545, 550, 555) may be due, for example, to an attacker's attempt to spoof a storage blob. Once the storage blob is successfully or unsuccessfully decrypted, the computing device 102 may then proceed to a next binding certificate, such as a binding certificate associated with the next-most-recent certificate creation timestamp in chronological order. The steps 540, 545, 550, and 555 may be performed on each of the remaining binding certificates.

In one or more implementations, the steps 540, 545, 550, and 555 may be performed for one binding certificate and associated storage blob at a time. In such cases, the computing device 102 performs the steps 540, 545, 550, and 555 sequentially for one binding certificate and associated storage blob prior to performing the steps 540, 545, 550, and 555 on a next binding certificate and associated storage blob. Alternatively, the steps 540, 545, 550, and 555 may be performed in parallel, with one or more of the steps being performed in association with a different binding certificate.

In one or more implementations, the example process 500 may be performed after the computing device 102 is wiped (e.g., hardware reset, installation of a different operating system, etc.). Subsequent to the wipe, the computing device 102 may attempt to retrieve data stored in the computing device 102. For example, the computing device 102 may have instructions stored (e.g., persistent instructions that remain in the computing device 102 after the wipe) that, when executed, cause the computing device 102 to attempt to retrieve data stored in the computing system 112.

The retrieved data may allow the computing device 102 to be restored to a state prior to the wipe. For example, the computing device 102 may be an enterprise-enrolled device. The computing device 102 may store its enrollment credentials in the computing system 112. Subsequent to a device reset, the computing device 102 may retrieve the credentials and re-establish enterprise enrollment. In such cases, the computing device 102 may remain under control of remote management even after a malicious, accidental, or intentional state loss on the computing device 102.

In one or more implementations, the subject technology provides remote security storage by facilitating communication between the computing device 102 (e.g., a client device) and the computing system 110 (e.g., a Privacy CA) and between the computing device 102 and the computing system 112 (e.g., a storage server) providing a storage service (e.g., cloud storage service). The computing device 102 is associated with a device owner, which may be a user or an organization entrusting information to the computing device 102 with an expectation that the information is not to be exposed in a network environment. The Privacy CA may be in accordance the TPM specification and may be assumed to be and referred to as a trusted third party. The storage service may keep data stored in the computing system 112 indexed by data identifiers generated by the computing device 102. Guessing (e.g., by an attacker) data identifiers without knowledge of information utilized to generate the data identifiers is generally difficult. A security analysis of the subject technology may assume that storage blobs known to the computing system 112 is public. In some aspects, the Privacy CA and the storage server may be operated by or otherwise provided by a same provider. In other aspects, the Privacy CA and the storage server may be operated by or otherwise provided by different providers.

In one or more implementations, the following threat model assumptions may be utilized in the security analysis. The device hardware and device TPM of the computing device 102 are assumed to be intact and working properly. The operating system image on the computing device 102 is assumed to be valid, such that client-side implementation of the subject technology is not compromised when the computing device 102 creates and validates data (e.g., storage blobs). An attacker generally does not have physical access to the computing device 102 for the period of time that the computing device 102 is under control of the device owner. In certain example attack scenarios discussed below, an attacker may get physical access to the computing device 102 before the device owner acquires the computing device 102 or after the device owner relinquishes ownership.

For a scenario in which an attacker achieves physical access to the computing device 102 while the computing device 102 is owned by the device owner, the attacker can successfully decrypt storage blobs stored in the computing system 112 (e.g., the storage server). Since the attacker has physical access to the computing device 102, the attacker may make malicious modifications to the computing device 102 directly (e.g., without utilizing storage blobs), or indirectly through a staged storage blob.

The subject technology provides security in various attack scenarios. The various attack scenarios are categorized for clarity of discussion only.

In a decryption attack, an attacker that has obtained device parameters, including, for example, hardware identifiers, public endorsement key, and locally stored identifier, of the computing device 102 may wish to decrypt the storage blobs stored in the computing system 112 (e.g., the storage server). With the device parameters, the attacker may be able to determine correct data identifiers for downloading storage blobs that the computing device 102 stored in the computing system 112.

Since the attacker knows the locally stored identifier of the computing device 102, the attacker can decrypt the binding certificate, which may allow the attacker to learn the current boot mode of the computing device 102, the endorsement key fingerprint, the public half of the attestation identity key, and the client nonce. With the client nonce, the attacker may be able to construct a valid request to the computing system 110 (e.g., the Privacy CA) to obtain a PCA-brokered identifier. However, since the attacker does not have access to the computing device 102 and does not have access to the TPM of the computing device 102, the attacker is unable to decrypt an attestation response from the computing system 110 to unwrap the encryption key (e.g., tied to the TPM endorsement key) contained in the attestation response. Accordingly, in one or more implementations, the subject technology may preclude an attacker from performing a decryption attack. In some aspects, if the attacker observes state blobs stored in the computing device 102 over a longer period of time, the attacker's ability to recover binding certificate timestamps may allow the attacker to gain insight on whether and how often the computing device 102 updates the storage blobs.

In a spoofing attack, the attacker that has knowledge of the device parameters may attempt to spoof a storage blob on the computing system 112 to cause injection of malicious payloads in the computing device 102 when the computing device 102 decrypts the spoofed storage blob. With the locally stored identifier of the computing device 102, the attacker may encrypt arbitrary binding certificate data. To make the binding certificate appear valid to the computing device 102, the attacker needs to obtain a valid signature from the computing system 110. With the device parameters, the attacker may generate a valid request to the computing system 110 for a new binding certificate and a PCA-brokered identifier. However, without access to the TPM of the computing device 102, the attacker is not able to decrypt an attestation response from the computing system 110 to unwrap the encryption key (e.g., tied to the TPM endorsement key) contained in the attestation response. Thus, the attacker is not able to obtain a new binding certificate.

The attacker may attempt to reuse a binding certificate obtained from a valid storage blob that the attacker downloaded from the computing system 112. The attacker has to copy the entire binding certificate verbatim for the spoofing attempt, as any modification would be detected by the computing device 102. The attacker may attempt to inject a spoofed payload. Obtaining a new encryption key is not an option to the attacker, since attempts to acquire the new encryption key will fail due to the attacker's inability to obtain a PCA-brokered identifier. Accordingly, the attacker is not able to construct a spoofed payload. Accordingly, in one or more implementations, the subject technology may preclude an attacker from performing a spoofing attack.

In a replay attack, an attacker may hold on to an entire storage blob that the computing device 102 generated at some point in time. At a later point in time, after the computing device 102 has replaced the storage blob in the computing system 112 with a newer version, the attacker may attempt to inject the storage blob retained by the attacker in an attempt to have the computing device 102 utilize the injected storage blob.

Since the computing system 112 does not have knowledge of storage blob validity, a second copy of the storage blob, which is provided by the attacker, is accepted by the computing system 112 and made available for download by the computing device 102. However, during binding certificate verification, the computing device 102 may compare the binding certificate creation timestamps from the different storage blobs and determine that the storage blob by the attacker is older than the updated storage blob generated by the computing device 102. Thus, the verification will fail and the injected storage blob will not be utilized by the computing device 102.

A variant to the replay attack occurs when the computing system 112 does not have a most recent storage blob in the attacked bucket, so an old storage blob may appear to be the freshest (e.g., newest). To create this situation, the attacker may wait until the computing device 102 transitions to a subsequent data identifier for retrieval, and the attacker may then replay an old storage blob using the subsequent data identifier. In a first example case, if a fresher storage blob is present for storage blobs keyed by the subsequent data identifier, the older storage blob replayed by the attacker will not take effect. In a second example case, if there is no fresher storage blob, e.g., when all the fresher storage blobs have already expired and are no longer valid for the bucket that is examined, the replayed storage blob is also expired as it was created earlier than at least some of the other storage blobs. Thus, the computing device 102 will reject the replayed storage blob as invalid.

A scenario may exist where an attacker has physical access to the computing device 102 before the device owner acquires control of the computing device 102. For example, the scenario may occur when the computing device 102 is intercepted during shipment. For the following security analysis, the hardware is assumed not to have been compromised. Physical access to the computing device 102 may provide the attacker with the ability to interact with the TPM before the device owner takes control, which may allow the attacker to create a valid storage blob in preparation for a later attack.

In a first example case, the attacker may stage the malicious storage blob before the computing device 102 reaches the intended device owner. Since the storage blob is the freshest storage blob generated by the computing device 102, the storage blob will validate and the computing device 102 will act on the storage blob. This example case is generally indistinguishable from a regular ownership transition where the computing device 102 created a valid (e.g., legitimate) storage blob while the computing device 102 belonged to the previous device owner and that previous owner did not clear the storage blob prior to passing the computing device 102 to the new device owner. The computing device 102 itself might not be aware of the device owner transition and continues to behave in accordance with its design without regard to the device owner transition.

In a second example case, the attacker may stage the malicious storage blob after the intended device owner starts using the computing device 102. The computing device 102 may now pick up the staged storage blob at a later time and take action on the staged storage blob. The computing device 102 might not be able to distinguish a valid storage blob from a malicious storage blob.

In the two example cases above, a mismatch exists between a physical ownership of the computing device 102 and a logical ownership of the computing device 102. The previous device owner or the attacker may have created valid storage blobs that the computing device 102 consumes even after physical ownership has changed, thus putting the computing device 102 into a state that might not intended by the new device owner.

For example, the attacker may intercept the computing device 102 and transition the computing device 102 into a malicious state, such as enterprise-enrolling the computing device 102, becoming a consumer device management owner, and so forth, and then allow the computing device 102 to reach the intended device owner. An expectation of the attacker is that most users do not perform a hardware reset upon receiving the computing device 102. With storage blobs in the computing system 112, the computing device 102, which may be maliciously prepared by the attacker, remains in the malicious state set by the attacker even if the intended device owner performs a hardware reset.

To help mitigate these situations, the computing device 102 may provide manners and/or mechanisms to more clearly indicate to the new device owner who/what is identified as the logical device owner, so the new device owner can invoke escalation paths to get ownership realigned. For example, before decrypting and applying storage blobs during out-of-box experience (OOBE), the computing device 102 may indicate the party that uploaded the storage blob to the computing system 112 (e.g. providing text stating "This device is managed by example.com").

A scenario may exist where an attacker has physical access after the device owner has relinquished device ownership. The attacker may learn all the device parameters (e.g., hardware identifiers, public endorsement key, locally stored identifiers, etc.) and also has access to the TPM. With possession of the TPM, the attacker has the ability to obtain the PCA-brokered identifier for a given storage blob, derive the encryption key, and decrypt the payload. Thus, the computing device 102 is able to decrypt data previously stored in the computing system 112 (e.g., the storage server).

To help mitigate these issues, a mechanism may be provided to allow previous device owners of the computing device 102 to clear the data that the previous device owners uploaded to the computing system 112 using the computing device 102. In some cases, the mechanism might not be sufficient. As a first example, the attacker may have copied out the storage blobs opportunistically before the device owner cleared the storage blobs. As a second example, removal of a storage blob from the computing system 112 may allow another storage blob to be the freshest, which may allow a possibility of replay attacks.

Figure 6:
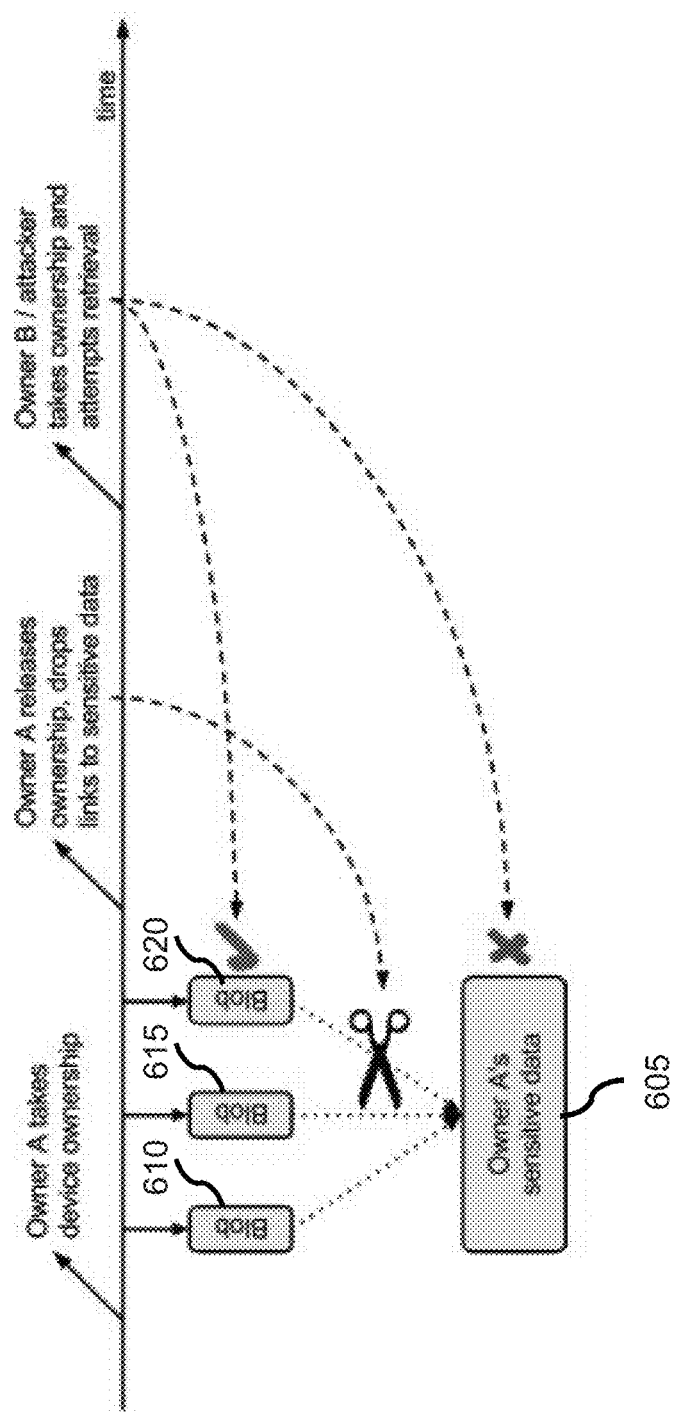
FIG. 6 illustrates an example mechanism and associated timeline for facilitating remote storage security in accordance with one or more implementations.

To help mitigate these issues, FIG. 6 illustrates an example mechanism and associated timeline for facilitating remote storage security in accordance with one or more implementations. A level of indirection is utilized by keeping sensitive data 605 in separate storage and have storage blobs 610, 615, and 620 only contain credentials (e.g., such as a bearer token for device authentication) to access the sensitive data 605. Then, when the device owner wishes to relinquish ownership of the computing device 102, the device owner can also invalidate credentials such that the computing device 102 can no longer access the linked sensitive data 605 even after successful decryption of the storage blobs 610, 615, and 620 to obtain the access credentials. Thus, although the new device owner may be able to successfully decrypt the storage blobs 610, 615, and 620, the new device owner is unable to access the sensitive data 605.

An attack scenario may exist where the computing system 112 (e.g., running the storage service) is rogue and/or compromised. An attacker gaining control of the storage device may have the storage service return spoofed storage blobs, which may be similar to the spoofing attack described above. The attacker may manipulate storage blobs, which in some cases may involve removing an original storage blob and serving another storage blob, similar to the replay attack described above.

The attacker that gains control of the storage service may gain ability to ignore storage blobs uploaded by client devices (e.g., the computing device 102). Not returning valid storage blobs in responses to the client devices may cause the client devices to fall back to an older storage blob they have uploaded, consider that storage blob to be the freshest, and act on the storage blob. While the fall back by the client devices to an older storage blob may possibly provide an ability to mount a successful replay attack against the client devices, the storage service's general lack of knowledge of the semantics of a storage blob hampers the utility of such an attack.

Although the computing system 110 (e.g., Privacy CA) is generally considered to be a trusted party, an attack scenario may exist where the computing system 110 is rogue and/or compromised (e.g., an attacker modifies behavior of the Privacy CA maliciously). An attacker controlling the computing system 110 will be able to issue binding certificates holding arbitrary attacker-controlled data, such as inaccurate boot mode, certify fake attestation identity keys and certificate creation timestamps, etc., as well as pass certificates to entities that have not proven their possession of a corresponding endorsement key to which the certificate belongs. This may provide the attacker with the ability to construct binding certificates for devices that will look valid when verified by the devices. However, the computing system 112 does not know locally stored identifiers of the devices and, accordingly, will not be able to stage spoofed storage blobs.

The attacker may manipulate PCA-brokered identifier generation. For example, the attacker may return a constant response regardless of input. This will make all devices use the same predictable PCA-brokered identifier when deriving the encryption key. However, without all the device identifiers (e.g., the locally stored identifiers, etc.), attempts to decrypt the storage blobs will be unsuccessful.

An attack scenario may exist where collusion exists between the computing system 110 (e.g., the Privacy CA) and the computing system 112 (e.g., the storage server). Similar to the case with a rogue and/or compromised Privacy CA, the computing system 112 does not have knowledge of any identifiers of the devices (e.g., locally stored identifiers, etc.). Thus, collusion between the computing system 110 and the computing system 112 generally does not open additional attack vectors over those previously described.

An attack scenario may exist where collusion exists between the computing system 110 (e.g., the Privacy CA) and a device manufacturer. If a malicious Privacy CA that keeps track of PCA-brokered identifiers colludes with a device manufacturer that retains knowledge of identifiers (e.g., locally stored identifiers) assigned to the devices at manufacturing time, the attacker is able to decrypt storage blobs successfully. A possible mitigation for this attack is manufacturing process design and contractual obligations that prevent the identifiers associated with the manufactured devices to be harvested in the factory en masse. A similar attack scenario exists when a malicious Privacy CA colludes with an attacker that has managed to obtain identifiers from the devices.

The subject technology provides systems and methods for facilitating remote (e.g., off-device) storage security. In one or more implementations, the subject technology ties an encryption key to the computing device that generated the encryption key, where the encryption key allows decryption of the previously-stored data in the remote storage. The subject technology may also allow only the computing device to generate and regenerate the encryption key. The subject technology may allow for authenticated encryption to provide integrity and authenticity for encrypted data.

In one or more implementations, the subject technology utilizes various data structures to facilitate remote storage security. A container encrypted using one or multiple device-specific identifiers, for example a locally stored identifier of the computing device 102, may be accessible to the public. A binding certificate and components therein (e.g., public attestation identity key, endorsement key fingerprint, boot mode, certificate creation timestamp, client nonce, etc.) may be accessible to the computing device 102, the computing system 110 (e.g., Privacy CA), and holders of the one or multiple device-specific identifiers. A container encrypted using an encryption key may be accessible to the public. Payload data associated with the container is accessible to the computing device 102. Size of the payload data may be kept within predetermined limits to facilitate quick download. An example size limit may be on the order of megabytes.

In one or more implementations, data being stored off-device is encrypted such that only the computing device 102 that encrypted the data may eventually decrypt the data. In some aspects, the encryption key is only accessible to the computing device 102 that contains the TPM utilized to generate the encryption key. The computing system 112 (e.g., the storage server) may not be allowed to get access to any payload data in the clear (e.g., unencrypted) at any time. This security may allow safe storage of authentication credentials, such as bearer tokens belonging to the computing device 102 in the computing system 112.

In one or more implementations, no data utilized for generating various identifiers (e.g., data identifiers, etc.) is held in volatile device memory of the computing device 102. In such cases, the subject technology allows retrieval of the data stored in a secure off-device storage, such as the computing system 112, after a reset (e.g., a full factory reset) of the computing device 102 through generation of the various identifiers. The subject technology allows anonymous retrieval of the data from the computing system 112, since the computing device 102 utilize time-dependent, stable, and non-predictable identifiers to key the data stored in the computing system 112.

In one or more implementations, the subject technology allows data to be authenticated such that the computing device 102 may verify that the data eventually getting pulled back to the computing device 102 and decrypted by the computing device 102 was previously created by the computing device 102 itself and matches the data corresponding to the latest write issued by the computing device 102. Authentication allows, for example, prevention of spoofing attacks, which may occur when malicious parties stage (e.g., place) data in the off-device storage that causes the computing device 102 to behave in accordance with the malicious parties' instructions after reading back the data to the computing device 102.

In one or more implementations, the subject technology may be utilized in the different boot modes provided by an operating system run by the computing device 102, such as verified boot mode and developer mode, and without affecting data created in the different modes. The subject technology allows the state is kept separate for the different boot modes and state created in one boot mode is inaccessible to a different mode. For example, the separation of the states created in the different modes may allow storing data (e.g., sensitive data) in the off-device storage in the verified boot mode and prevent extraction of this data after an attacker switches the computing device 102 to a different mode (e.g., the developer mode).

The subject technology may allow the computing device 102 to keep an encryption key in a secure off-device storage, such as in the storage service provided by the computing system 112, that may be utilized by the computing device 102 to encrypt log data generated on the computing system 112. The encrypted log data may be stored in the secure off-device storage. Encrypting the log data avoids privacy implications of remote logging. If the computing device 102 is wiped (e.g., through a hardware reset) or otherwise fails, the computing device 102 may decrypt the log data using the encryption key in the secure off-device storage.

The subject technology may allow for device-specific secure storage media. For example, an encryption key for disk contents may be stored in a secure off-device storage. The disk contents may survive device recovery and developer mode transitions. The subject technology may be utilized for backup services (e.g., reinstall-and-restore services). The subject technology may allow secure escrow for various keys held by a device and may allow re-instatement a device owner key, extensible authentication protocol (EAP) network keys, and so forth).

In one or more implementations, the subject technology allows for remotely managed devices to remain in the remotely managed state in an event of local state loss (e.g., due to a wipe). Remotely managed devices may be enterprise-enrolled devices. To maintain the remotely managed state, information may be stored in secure storage (e.g., the computing system 112) for maintaining an association between a device (e.g., the computing device 102) and a device management service by which the device is remotely managed, such as bearer tokens to authenticate the device to the device management service. The device may re-acquire the information from the secure storage after detecting local loss of information or after a full device reset. The device may check for local loss of information on a periodic basis.

Figure 7:
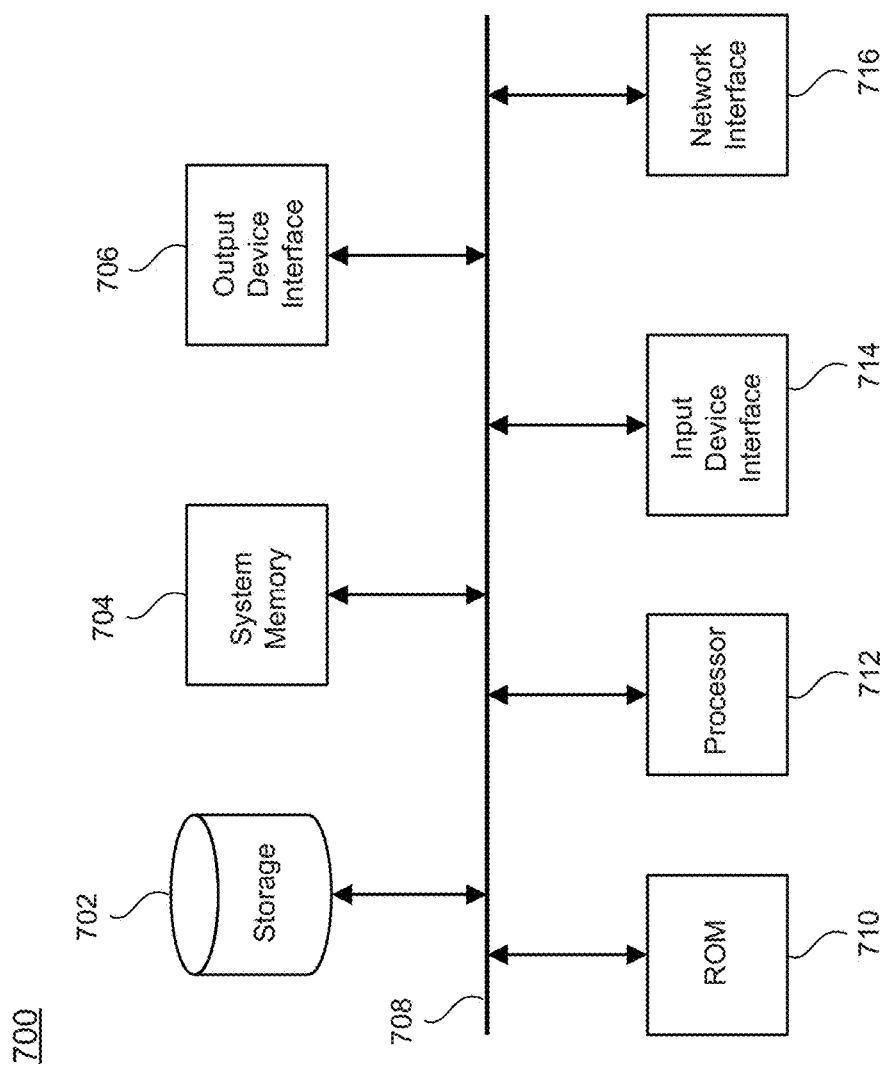
FIG. 7 conceptually illustrates an example electronic system with which some implementations of the subject technology can be implemented.

FIG. 7 conceptually illustrates an example electronic system with which some implementations of the subject technology can be implemented. Electronic system 700 can be a computer, phone, PDA, or any other sort of electronic device. Such an electronic system includes various types of computer readable media and interfaces for various other types of computer readable media. The computing devices 102-106 and computing systems 110-114 of FIG. 1 may be or may include the electronic system 700. Electronic system 700 includes a bus 708, processing unit(s) 712, a system memory 704, a read-only memory (ROM) 710, a permanent storage device 702, an input device interface 714, an output device interface 706, and a network interface 716.

Bus 708 collectively represents all system, peripheral, and chipset buses that communicatively connect the numerous internal devices of electronic system 700. For instance, bus 708 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of the electronic system. Permanent storage device 702, on the other hand, is a read-and-write memory device. This device is a non-volatile memory unit that stores instructions and data even when electronic system 700 is off. Some implementations of the subject disclosure use a mass-storage device (for example, a magnetic or optical disk and its corresponding disk drive) as permanent storage device 702.

Other implementations use a removable storage device (for example, a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such as a random access memory. System memory 704 stores some of the instructions and data that the processor needs at runtime. In some implementations, the processes of the subject disclosure are stored in system memory 704, permanent storage device 702, or ROM 710. For example, the various memory units include instructions for encrypting and storing data and retrieving and decrypting data from a remote storage, in accordance with some implementations. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to the electronic system. Input devices used with input device interface 714 include, for example, alphanumeric keyboards and pointing devices (also called "cursor control devices"). Output device interfaces 706 enables, for example, the display of images generated by the electronic system 700. Output devices used with output device interface 706 include, for example, printers and display devices, for example, cathode ray tubes (CRT) or liquid crystal displays (LCD). Some implementations include devices, for example, a touchscreen that functions as both input and output devices.

Finally, as shown in FIG. 7, bus 708 also couples electronic system 700 to a network (not shown) through a network interface 716. In this manner, the computer can be a part of a network of computers (for example, a local area network (LAN), a wide area network (WAN), or an Intranet, or a network of networks, for example, the Internet). Any or all components of electronic system 700 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A. B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for". Furthermore, to the extent that the term "include", "have", or the like is used in the description or the claims, such term is intended to be inclusive in a manner similar to the term "comprise" as "comprise" is interpreted when employed as a transitional word in a claim.

What is claimed is:

1. A computer-implemented method, comprising:
   generating, by a first computing device, a first encryption key based at least on data stored locally by the first computing device;
   binding the first encryption key to a context of the first computing device using a binding certificate from a device remote from the first computing device, wherein the binding certificate is generated based on a timestamp associated with the binding and a boot mode associated with the first computing device at a time of creation of the binding certificate;
   encrypting data using the bound first encryption key so that the encrypted data is unusable by encryption keys bound to a context different than the context of the first computing device; and
   providing, for transmission to a second computing device, the encrypted data and information associated with the binding.

2. The method of claim 1, wherein:
   the information associated with the binding comprises the binding certificate, and
   the timestamp is based on the time of creation of the binding certificate.

3. The method of claim 1, wherein the binding comprises:
   Sending, by the first computing device, a request for the binding certificate; and
   receiving, from a third computing device, the binding certificate.

4. The method of claim 1, further comprising:
   encrypting the binding certificate using an endorsement key associated with the first computing device,
   wherein the providing comprises providing, for transmission to the second computing device, the encrypted data and the encrypted binding certificate.

5. The method of claim 1, further comprising:
generating a nonce;
providing, for transmission to a third computing device, the generated nonce; and
receiving an identifier from the third computing device, wherein the generated nonce is used for generating the received identifier,
wherein the received identifier is used for generating the first encryption key.

6. The method of claim 5, wherein the received identifier is further based on an endorsement key associated with the first computing device.

7. The method of claim 1, further comprising:
generating a data identifier;
associating the data identifier with the encrypted data; and
providing, for transmission to the second computing device, the data identifier.

8. The method of claim 7, further comprising:
retrieving, using the data identifier, the encrypted data and the information associated with the binding from the second computing device;
generating a second encryption key based on the information associated with the binding; and
decrypting the encrypted data using the second encryption key,
wherein the encrypted data is successfully decrypted using the second encryption key when the first encryption key matches the second encryption key.

9. The method of claim 8, further comprising:
obtaining a nonce contained in the information associated with the binding;
providing, for transmission to a third computing device, the obtained nonce; and
receiving an identifier from the third computing device, wherein the received identifier is based at least on the obtained nonce,
wherein the second encryption key is further based on the received identifier.

10. A system, comprising:
one or more processors; and
a non-transitory computer-readable medium comprising instructions stored therein, which when executed by the one or more processors, cause the one or more processors to perform operations comprising:
receiving a binding certificate from a first computing device remote from the system, the binding certificate being generated based on a boot mode associated with the system at a time of creation of the binding certificate;
generating a first encryption key based at least on data stored locally in the system;
binding the first encryption key to the binding certificate using a symmetric encryption key embedded in the first computing device, wherein the binding certificate comprises information associated with a context of the system, the context comprising a timestamp associated with the binding certificate;
encrypting data using the bound first encryption key so that the encrypted data is unusable by encryption keys bound to a context different than the context of the system; and
providing, for transmission to a storage device, the encrypted data and the binding certificate.

11. The system of claim 10, wherein the operations further comprise:
encrypting the binding certificate using an endorsement key associated with the system,
wherein the providing comprises providing, for transmission to the storage device, the encrypted data and the encrypted binding certificate.

12. The system of claim 10, wherein the operations further comprise:
generating a nonce;
providing, for transmission to the computing device, the generated nonce; and
receiving an identifier from the computing device, wherein the received identifier is generated based at least on the generated nonce,
wherein the first encryption key is generated based on the received identifier.

13. The system of claim 12, wherein the received identifier is further based on an endorsement key associated with the system.

14. The system of claim 10, wherein the operations further comprise:
generating a data identifier; and
associating the data identifier with the encrypted data; and
providing, for transmission to the computing device, the data identifier.

15. The system of claim 14, wherein the operations further comprise:
retrieving, using the data identifier, the encrypted data and the binding certificate;
generating a second encryption key based on the binding certificate; and
decrypting the encrypted data using the second encryption key,
wherein the encrypted data is successfully decrypted using the second encryption key when the first encryption key matches the second encryption key.

16. The system of claim 15, wherein the operations further comprise:
obtaining a nonce contained in the binding certificate;
providing, for transmission to the computing device, the obtained nonce; and
receiving an identifier from the computing device, wherein the received identifier is based at least on the obtained nonce,
wherein the second encryption key is further based on the received identifier.

17. A non-transitory machine-readable medium comprising instructions stored therein, which when executed by a machine, cause the machine to perform operations comprising:
generating, by a first computing device, a nonce;
providing, for transmission to a second computing device, the generated nonce;
receiving a binding certificate and an identifier from the second computing device, wherein the binding certificate is generated based on the nonce and a boot mode associated with the first computing device, and wherein the received identifier is based at least on the generated nonce;
generating, by the first computing device, a first encryption key based at least on data stored locally by the first computing device and the received identifier;
deriving a symmetric encryption key from a locally stored identifier of the first computing device;
encrypting the binding certificate using the symmetric encryption key;
binding the encryption key to a context of the first computing device using the binding certificate;

encrypting data using the first encryption key so that the encrypted data is unusable by encryption keys bound to a context different than the context of the first computing device; and providing, for transmission to a storage device, the encrypted data and information associated with the binding.

18. The non-transitory machine-readable medium of claim 17, wherein the operations further comprise:

generating a data identifier;

associating the data identifier with the encrypted data;

providing, for transmission to the computing device, the data identifier;

retrieving, using the data identifier, the encrypted data and the binding certificate;

generating a second encryption key based on the binding certificate; and decrypting the encrypted data using the second encryption key, wherein the encrypted data is successfully decrypted using the second encryption key when the first encryption key matches the second encryption key.

19. The non-transitory machine-readable medium of claim 18, wherein the operations further comprise:

obtaining the generated nonce contained in the binding certificate;

providing, for transmission to the second computing device, the obtained nonce; and receiving an identifier from the second computing device, wherein the received identifier is generated based at least on the obtained nonce, wherein the second encryption key is generated based on the received identifier.

* * * * *

UNITED STATES PATENT AND TRADEMARK OFFICE
CERTIFICATE OF CORRECTION

PATENT NO. : 10,311,240 B1
APPLICATION NO. : 14/835652
DATED : June 4, 2019
INVENTOR(S) : Mattias Stefan Nissler et al.

It is certified that error appears in the above-identified patent and that said Letters Patent is hereby corrected as shown below:

On the Title Page

In "Other Publications", item (56):
"Zwattendorfer, et al., "Secure Hardware-Based Public Cloud Storage," Open Idntity Summit, 2013, retrieved from <https://online.tugraz.at/tug_online/voe_main2.getvolltext?pCurrPk=7222l>.";
Should read:
--Zwattendorfer, et al., "Secure Hardware-Based Public Cloud Storage," Open Identity Summit, 2013, retrieved from <https://online.tugraz.at/tug_online/voe_main2.getvolltext?pCurrPk=7222l>.--

Signed and Sealed this
Twenty-seventh Day of August, 2019

Andrei Iancu
*Director of the United States Patent and Trademark Office*